US008726259B2

(12) United States Patent
Juneja

(10) Patent No.: US 8,726,259 B2
(45) Date of Patent: May 13, 2014

(54) SYSTEM AND METHOD FOR PRESERVING DEVICE PARAMETERS DURING A FOTA UPGRADE

(75) Inventor: Anupam Juneja, San Diego, CA (US)

(73) Assignee: KYOCERA Corporation, Tokyo (JP)

(*) Notice: Subject to any disclaimer, the term of this patent is extended or adjusted under 35 U.S.C. 154(b) by 1037 days.

(21) Appl. No.: 11/733,026

(22) Filed: Apr. 9, 2007

(65) Prior Publication Data

US 2010/0313194 A1 Dec. 9, 2010

(51) Int. Cl.
*G06F 9/44* (2006.01)

(52) U.S. Cl.
USPC .......................................................... 717/168

(58) Field of Classification Search
CPC ............. G06F 8/65; G06F 9/445; H04W 8/26
USPC .................... 717/168; 455/418–420
See application file for complete search history.

(56) References Cited

U.S. PATENT DOCUMENTS

| 6,317,755 | B1 * | 11/2001 | Rakers et al. | 455/428 |
|---|---|---|---|---|
| 6,961,537 | B2 * | 11/2005 | Rajaram | 455/3.01 |
| 7,561,877 | B2 * | 7/2009 | Cassett et al. | 455/423 |
| 7,584,466 | B1 * | 9/2009 | Rao | 717/168 |
| 7,685,508 | B2 * | 3/2010 | Froyd et al. | 715/222 |
| 7,747,997 | B1 * | 6/2010 | Rao | 717/170 |
| 7,797,693 | B1 * | 9/2010 | Gustafson et al. | 717/168 |
| 7,805,719 | B2 * | 9/2010 | O'Neill | 717/168 |
| 8,261,256 | B1 * | 9/2012 | Adler et al. | 717/173 |
| 8,275,374 | B2 * | 9/2012 | Zinn et al. | 455/435.2 |
| 8,447,234 | B2 * | 5/2013 | Cook et al. | 455/41.2 |
| 8,479,189 | B2 * | 7/2013 | Chen et al. | 717/170 |
| 2003/0188303 | A1 * | 10/2003 | Barman et al. | 717/170 |
| 2004/0133887 | A1 * | 7/2004 | Herle et al. | 717/171 |
| 2005/0114852 | A1 * | 5/2005 | Chen et al. | 717/168 |
| 2005/0204353 | A1 * | 9/2005 | Ji | 717/168 |
| 2007/0169093 | A1 * | 7/2007 | Logan et al. | 717/168 |
| 2007/0207800 | A1 * | 9/2007 | Daley et al. | 455/425 |
| 2007/0294385 | A1 * | 12/2007 | Kapadekar et al. | 709/223 |
| 2007/0300068 | A1 * | 12/2007 | Rudelic | 713/176 |
| 2008/0119178 | A1 * | 5/2008 | Peddireddy et al. | 455/418 |
| 2009/0204845 | A1 * | 8/2009 | Herscovitz et al. | 714/2 |

OTHER PUBLICATIONS

Benny Bing, "Over-the-Air Wireless Software Download Using Reconfigurable Mobile Devices", Jun. 2006, IEEE.*
Platen et al. "Feedback Linking Optimizing Object Code Layout for Updates", Jun. 2006, ACM.*

* cited by examiner

*Primary Examiner* — Wei Zhen
*Assistant Examiner* — Junchun Wu

(57) ABSTRACT

A device, system and method that preserves non-volatile items during a firmware over-the-air update are described. The electronic device comprises a non-volatile memory, a FOTA client module, and back-up and restore module. The non-volatile memory comprises one or more variant non-volatile items having one or more variant offsets associated with at least one of the variant non-volatile items. The FOTA client module is configured to receive the FOTA upgrade and replace an existing firmware program resident on the electronic device. The back-up and restore module is configured to store the variant non-volatile items before the FOTA client performs the FOTA upgrade. Additionally, the back-up and restore module is configured to restore the variant non-volatile items after the FOTA client performs the FOTA upgrade. The system further comprises a server that is configured to receive the FOTA upgrade and communicate the FOTA upgrade to the electronic device.

14 Claims, 5 Drawing Sheets

SYSTEM AND METHOD FOR PRESERVING DEVICE PARAMETERS DURING A FOTA UPGRADE

FIELD OF THE INVENTION

This invention relates to firmware over-the-air (FOTA) upgrades of mobile wireless communication devices and, more particularly, to a system and method for preserving device parameters during FOTA upgrades involving the modification of non-volatile items.

BACKGROUND

The mobile phone has undergone growth in the amount of software embedded on the device and updating the software is challenging once a handset has been shipped or released in the field. Firmware updating over-the-air (FOTA) represents a powerful tool for addressing bug fixes within the software and enabling new services after the phone has passed into the hands of the consumer.

Firmware is a computer program that is embedded in a mobile handset. Firmware was traditionally stored in read-only memory (ROM), however, cost and performance have driven component vendors to adopt various replacements, including non-volatile media such as EEPROM and Flash, or SRAM solutions.

In practical terms, firmware upgrades can improve the performance and reliability, indeed even the basic available functionality of an electronic device, and many devices benefit from firmware upgrades. Firmware updates ensure the operation of hardware is kept current and compatible.

Generally, FOTA refers to the process of allowing the software embedded in a mobile handset, i.e. firmware, to be updated wirelessly. FOTA technology allows for the creation off firmware updates that are compressed and transmitted over-the-air to the handset, and then decompressed and applied to the device.

FOTA is normally associated with fixing software defects, i.e. bugs, in the typical handset. FOTA can help accelerate time-to-market by allowing manufacturers to address non-critical software defects after the handset has been shipped. FOTA also holds the promise of allowing operators to update customers' handsets with new features and mobile services after the sale of the handset.

FOTA delivery is an application of Mobile Device Management (MDM), and is typically considered alongside other MDM applications such as automatic device detection and configuration, e-mail synchronization, device security and diagnostics. For over-the-air delivery, firmware updates utilize client-server protocols that are standardized by the Open Mobile Alliance (OMA) and referred to as OMA Device Management (OMA DM). OMA DM based FOTA updates are managed by manufacturers and mobile operators.

During a FOTA upgrade, the FOTA upgrade process does not address what happens to essential phone parameters identified as variant non-volatile items. Additionally, the FOTA upgrade process does not address the modification of these non-volatile items. Furthermore, when the new FOTA upgrade has gone from a first version number to a second version number, there may be changes to the non-volatile items that make the non volatile items inactive and put the wireless handset in an unusable state.

Therefore, there is a strong need to address these and other deficiencies in existing FOTA upgrade systems and methods.

SUMMARY

A device, system and method that preserves non-volatile items during and firmware over-the-air update are described. The electronic device comprises a non-volatile memory, a FOTA client module, and back-up and restore module. The non-volatile memory comprises one or more variant non-volatile items having one or more variant offsets associated with at least one of the variant non-volatile items. The FOTA client module is configured to receive the FOTA upgrade and replace an existing firmware program resident on the electronic device. The back-up and restore module is configured to store the variant non-volatile items before the FOTA client performs the FOTA upgrade. Additionally, the back-up and restore module is configured to restore the variant non-volatile items after the FOTA client performs the FOTA upgrade.

The system that preserves non-volatile items during a firmware over-the-air (FOTA) upgrade further comprises a server that is configured to receive the FOTA upgrade and communicate the FOTA upgrade to the electronic device. In the illustrative embodiment, the electronic device is a wireless mobile handset.

The method for preserving non-volatile items on the electronic device during a firmware over-the-air (FOTA) upgrade that comprises receiving a FOTA upgrade from a server is described. The method comprises providing a non-volatile memory having one or more variant non-volatile items with one or more variant offsets associated with at least one of the variant non-volatile items. The method then stores the variant non-volatile items before a FOTA client performs the FOTA upgrade. The method then proceeds to perform the FOTA upgrade and restores the variant non-volatile items before completing the FOTA upgrade.

BRIEF DESCRIPTION OF THE DRAWINGS

The present invention will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems, and devices described hereinafter may vary as to configuration and as to details. Additionally, the methods may vary as to details, order of the actions, or other variations without departing from the illustrative method disclosed herein.

Non-volatile data structures are associated with non-volatile memory. A non-volatile memory is computer memory that can retain the stored information even when not powered.

Examples of non-volatile memory include read-only memory, flash memory, or any other such memory that retains its stored information through a power cycle.

There are two kinds of non-volatile data structures, namely "variant" non-volatile data structures and "invariant" non-volatile data structures. These non-volatile data structures exist in the embedded file system (EFS) so they are preserved through a power cycle. Non-volatile data structures are associated with non-volatile items, which are components of a non-volatile file. By way of example and not of limitation, non-volatile items include a Mobile Directory Number (MDN), Home System Identification Code (Home-SID), Mode Preference, Roam Preference, Point-to-Point Protocol (PPP) User ID, PPP Password, Mobile IP, and other such non-volatile items that are associated with the non-volatile memory that would be well known to those of ordinary skill in the art.

The typical FOTA upgrade process does not address potential changes to essential non-volatile items that are used to establish communications between a wireless handset and a base station or access point. For example, during a FOTA upgrade from a first software version, e.g. Version 1.0.18, to a second software version, e.g. Version 1.0.19, there may be changes to "essential" non-volatile items. These changes comprise the addition of non-volatile items, the deletion of non-volatile items, changes in size of the non-volatile items, or any combination thereof. As a result of these changes to the essential non-volatile items, one or more of the non-volatile items may become inactive, and may put an illustrative wireless handset in an unusable state.

The systems, device and methods described herein preserve the integrity of the non-volatile items. Additionally, a FOTA upgrade system and method is presented that preserves essential phone parameters during the modification of non-volatile items. Furthermore, an electronic device that preserves non-volatile items and prevents putting the electronic device in an unusable state is described.

Figure 1:
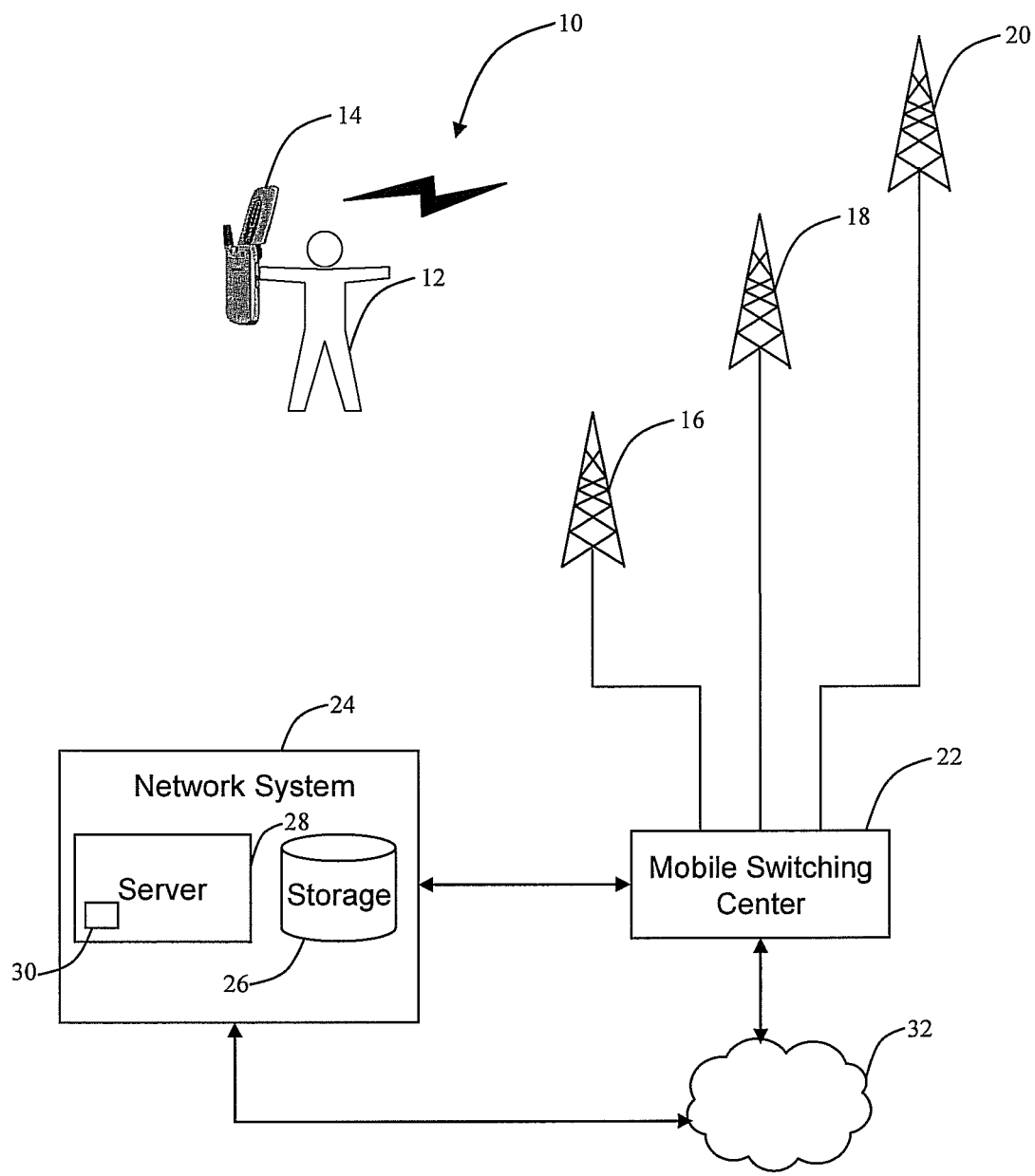
FIG. 1 shows an illustrative block diagram of a system that preserves phone parameters during a firmware over-the-air (FOTA) upgrade according to one embodiment.

Referring to FIG. 1 there is shown an illustrative block diagram of a system that preserves phone parameters during a firmware over-the-air (FOTA) upgrade. In the illustrative system 10, a subscriber 12 has access to a wireless handset 14. The wireless handset 14 is configured to communicate with one or more base stations 16, 18 and 20. The illustrative base stations 16, 18, and 20 may communicate with the wireless handset using a variety of different communication standards including, but not limited to, various forms of code division multiple access (CDMA) and time division multiple access (TDMA) wireless interfaces. Alternatively, the base stations may also be referred to as access points, or any other such two-way radio installation in a fixed location that is used to communicate with a wireless handset.

The illustrative wireless handset 14 may be a mobile handset, mobile phone, wireless phone, portable cell phone, cellular phone, portable phone, a personal digital assistant (PDA), or any type of mobile terminal which is regularly carried by a user and has all the elements for operation in a wireless communication system. The wireless communications systems include, by way of example and not of limitation, CDMA, GSM or UMTS or any other wireless communication system such as wireless local area network (WLAN) or WiMAX. It shall be appreciated by those of ordinary skill in the art that the term wireless handset, mobile handset, wireless phone, and mobile phone are interchangeable.

The illustrative wireless handset is configured to communicate wirelessly with base stations 16, 18 and 20, which are operatively coupled to mobile switching center 22. The mobile switching center 22 is configured to communicate with network system 24 having a storage component 26 and a firmware device management server 28.

The device management server 28 accepts an update package and delivers the illustrative package over-the-air to the wireless handset 14. The illustrative firmware device management server 28 is hosted by the carrier, or operator. Alternatively, the firmware device manager 28 is hosted by the handset manufacturer. The illustrative firmware management server 28 comprises a management module 30 that manages the firmware update through its entire lifecycle, across submission, approval, testing, scheduling of the download, status tracking and removal.

The mobile switching center 22 is also configured to communicate with a Wide Area Network (WAN) 32 represented by the network cloud. By way of example and not of limitation, the WAN 32 is the Internet. The WAN 32 is used to communicate a new firmware update, generated by an illustrative wireless handset manufacturer, to the device management server 28 that is hosted by the carrier. In the illustrative embodiment, the network system 24 instructs the wireless handset 14 to perform FOTA upgrades.

In operation, the firmware update cycle is a four stage process. During the first stage, the firmware update is generated by the manufacturer of wireless device 14. In the second stage, the firmware update is then communicated to the device management server 28. During the third stage, the firmware is downloaded to the illustrative wireless device. In the final stage, the wireless handset is updated.

The description provided herein is related to this final stage of updating the wireless handset. During this fourth stage or final stage of the FOTA upgrade process, an illustrative FOTA client processes and applies the FOTA upgrade so as to replace the existing firmware image with a new firmware upgrade. Those skilled in the art shall appreciate that the firmware update technology is independent of the Open Mobile Alliance (OMA) Device Management (DM) delivery protocol and is entirely decoupled from the server technology. The standardization of the client-server delivery protocol is largely responsible for this decoupling between the server and client technology.

Figure 2:
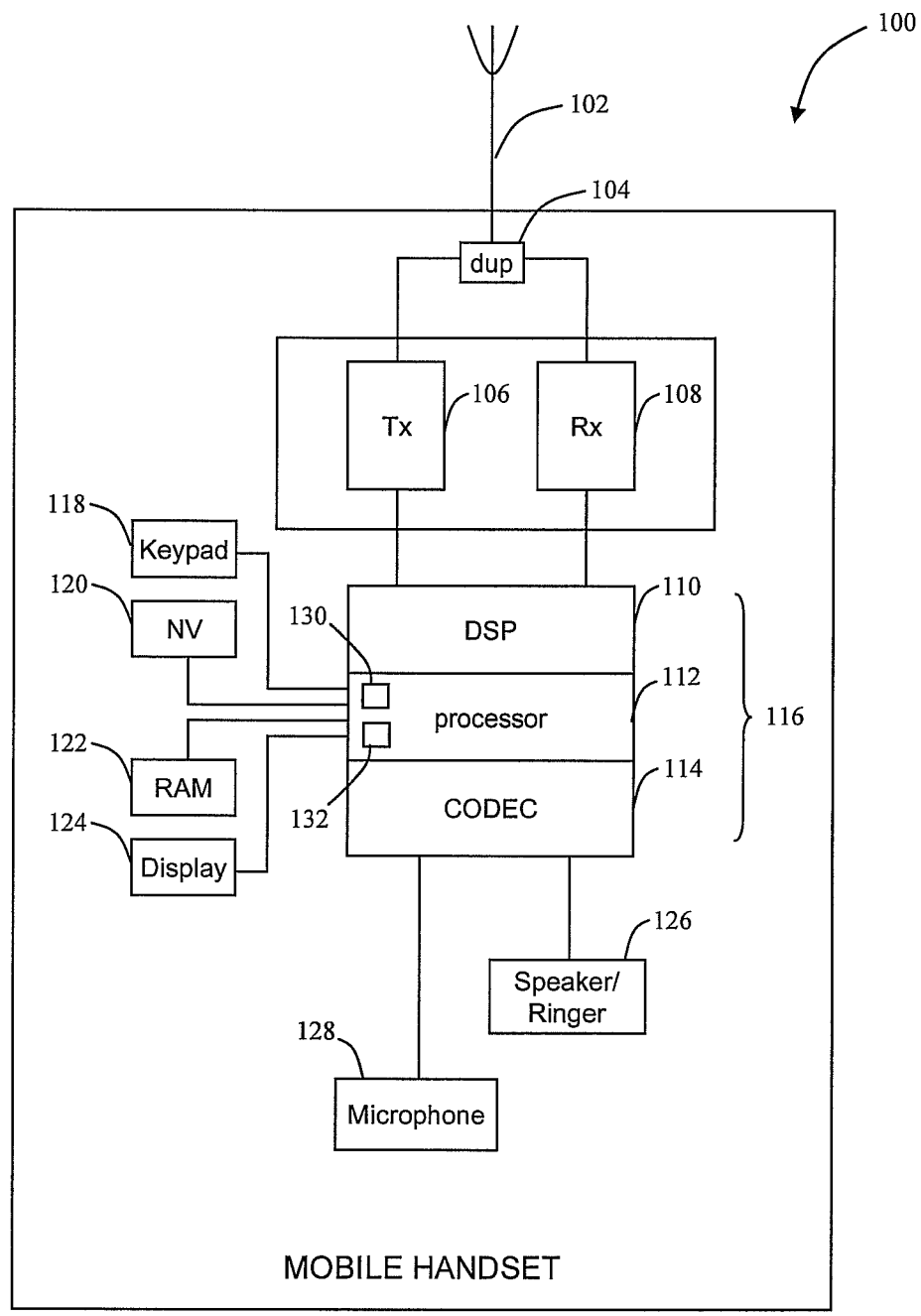
FIG. 2 shows a wireless handset preserves phone parameters during the FOTA upgrade according to one embodiment.

Referring to FIG. 2 there is shown a wireless handset that preserves phone parameters during the FOTA upgrade. The illustrative wireless handset 100 is configured to operate within the illustrative system 10 shown in FIG. 1.

The illustrative wireless handset 100 comprises a first antenna element 102 that is operatively coupled to a duplexer 104, which is operatively coupled to transmitter 106 and receiver 108. An illustrative control module 116 comprises a digital signal processor (DSP) 110, a processor 112, and a CODEC 114 that are communicatively coupled to the transmitter 106 and receiver 108. The DSP 110 may be configured to perform a variety of operations such as controlling the antenna 102, transmitter 106, and receiver 108 operations. The processor 112 is operatively coupled to a keypad 118, a non-volatile (NV) memory 120, a volatile memory represented by RAM 122, and a display 124. The processor 112 is also operatively coupled to the CODEC module 114 that performs the encoding and decoding operations and is communicative coupled to a speaker or ringer 126, and a microphone 128.

The illustrative wireless handset 100 may be built as a light weight and small device adapted to be portable and may be conveniently carried around by a user. The wireless handset 100 is further adapted for caller operation and is enabled to permit a user to manually input data with the keypad 118 that may be a normal key pad, such as key pad for a cell phone or a PDA, and may additionally include specific input keys, such as a scrolling means or the like, to input particular information or to perform particular selection functions. Input data or requests may be taken from voice information that are received from microphone 124 or a combination of voice information and DTMF signals. The memory modules 120 and 122 may be used for storing input data or storing programming information that is pre-loaded on the mobile handset 100, or that has been downloaded to the mobile handset 100.

In addition to the non-volatile memory 120 and volatile memory 122, the processor 112 comprises a FOTA client module 130 and a FOTA non-volatile (FOTANV) task module 132 or back-up and restore module 132. The FOTA client module 130 processes and applies the FOTA update so as to replace the existing firmware image with a new firmware upgrade. The FOTA client module 130 is responsible for unpacking the firmware upgrade and computing which regions on the handset need to be changed. The FOTA client 130 attempts to ensure fail-safe operation in all cases, including power loss or memory management. By way of example and not of limitation, the FOTA client module 130 is written by the OEM. Alternatively, the FOTA client module 130 is written by a FOTA vendor. In yet another alternative, the FOTA client may be referred to as an "update agent". By way of example and not of limitation, the update agent may be provided by an OS supplier.

In one embodiment, all the non volatile items in the back-up file are stored along with a checksum algorithm such as a cyclic redundancy check (CRC) to ensure that data has not been corrupted. By way of example and not of limitation, a 30-bit CRC may be generated using the polynomial $x^{30}$ $x^{29}$ $x^{21}$ $x^{20}$ $x^{15}$ $x^{13}$ $x^{12}$ $x^{11}$ $x^{8}$ $x^{7}$ $x^{6}$ $x^{2}$ $x^{1}$. During the restore process, if the checksum for any non-volatile item does not match the calculated checksum, then the non-volatile item will be made inactive. The checksum operation is performed by processor 112 to prevent rogue files from being installed.

The FOTANV task module 132 or "back-up and restore module" 132 performs a back-up and restore process for the variant non-volatile items. The back-up function performed by the FOTANV task module 132 comprises storing all the variant non-volatile items before having the FOTA client module 130 initiates the FOTA upgrade. By way of example and not of limitation, the variant non-volatile items are stored in a neutral file format such as XML. The back-up function of storing all the variant non-volatile items preserves the offsets in the Embedded File System (EFS) so that the offsets are consistent with the recent operational table in the most recent FOTA upgrade software. By way of example and not of limitation, the operational table in the FOTA upgrade software may be referred to as a "non volatile operation table file" that may embodied in an "nv_op_tab.c" file associated with a Qualcomm software protocol for wireless handsets.

Additionally the back-up and restore module 132 or FOTANV task module 132 performs a restore process after the FOTA upgrade is completed. During the restore process, the variant non-volatile items in the back-up file are rewritten to the recent FOTA upgrade software. By rewriting the back-up files, the offsets associated with the variant non-volatile items in the prior firmware version are made consistent with the operational table in the most recent FOTA upgrade software. In the illustrative embodiment, the items that are not present in the back-up file are made inactive.

In operation, the back-up and restore module 132 performs the back-up process before the FOTA upgrade starts and the restore process is performed after the FOTA upgrade is completed. Generally, the back-up and restore module 132 provides the triggers for initiating the backup process and restore process. In the illustrative embodiment, the main controller (TMC) task module enables or starts the back-up and restore module 132. For example, after the FOTA upgrade is completed, the wireless handset is rebooted; the TMC task module starts the FOTA client module 130, the Embedded File System, and the back-up and restore module 132. The back-up and restore module 132 proceeds to restore all the variant non-volatile items from the back-up file. After the restore process is completed, the TMC task module starts the remaining tasks or operations.

Figure 3:
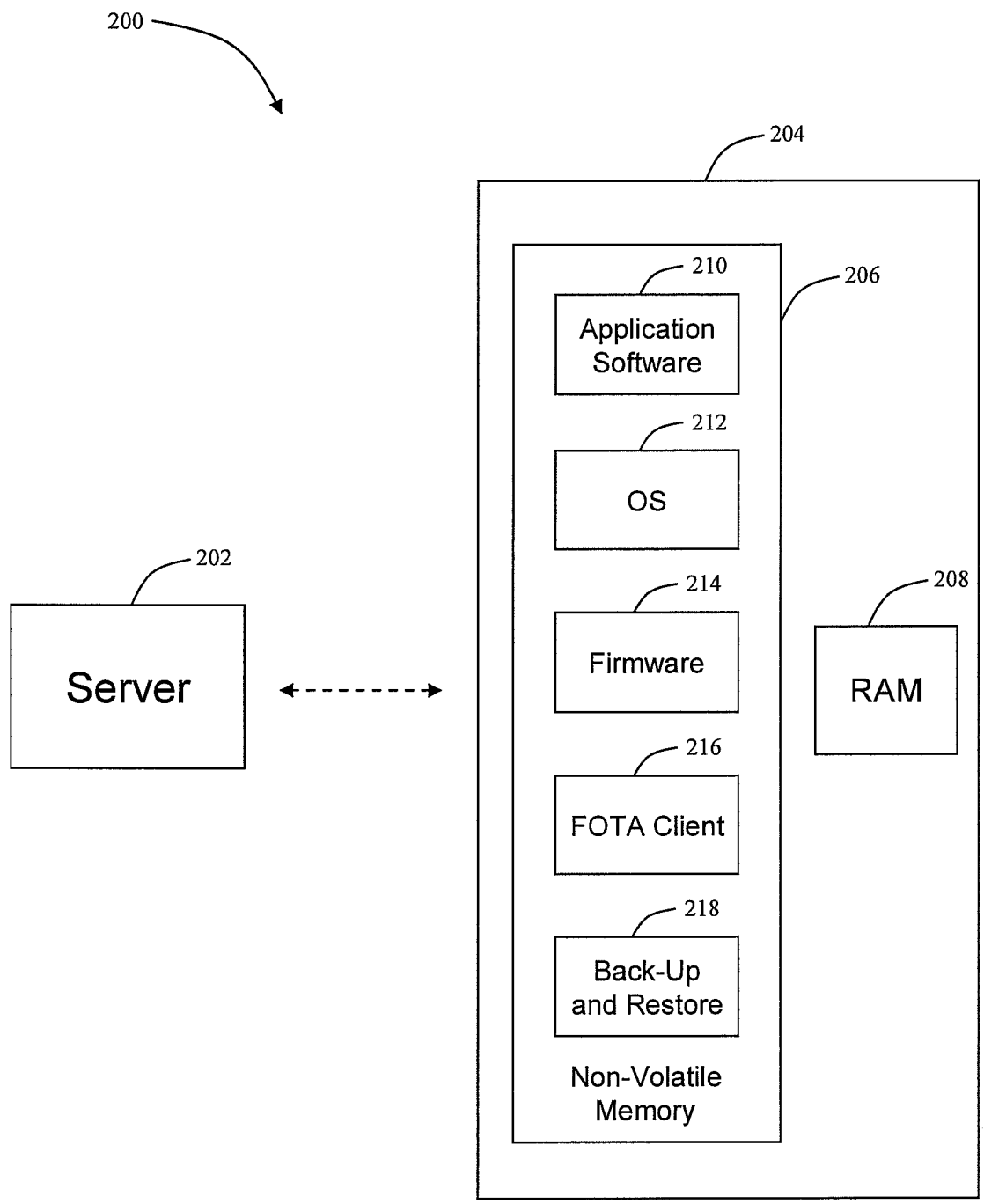
FIG. 3 shows an illustrative block diagram of a server communicating with an electronic device having a non-volatile memory according to one embodiment.

Referring to FIG. 3 there is shown an illustrative block diagram of a server communicating with an electronic device having a non-volatile memory. As previously noted, the description provided herein is related to this final stage of updating the wireless handset. During this final stage of the FOTA upgrade process, the FOTA client module 130 receives the FOTA update and replaces the existing firmware image with a new firmware upgrade. Those skilled in the art shall appreciate that the firmware update technology is independent of the Open Mobile Alliance (OMA) Device Management (DM) delivery protocol and is entirely decoupled from the server technology.

In the system 200, a server 202 communicates the FOTA update to an electronic device 204 such as wireless handset 100 or 14 described above. Note, the electronic device 204 also includes any electronic device that is configured to receive FOTA upgrades. The electronic device 202 is configured to receive firmware updates from the server 202. The server 202 functions are decoupled from the functions performed by the firmware update that is received by the electronic device 204. The electronic device comprises a non-volatile memory 206 and a volatile memory 208.

The volatile memory 208 is a computer memory that requires power to maintain the stored information, unlike non-volatile memory that does not require power to maintain stored or saved information. Typically, random access memory (RAM) is a volatile memory. There are various types of RAM including, but not limited to, dynamic random access memory (DRAM) and static random access memory (SRAM).

The non-volatile memory 206 is computer memory that can retain saved or stored information when the electronic device 202 is not powered up. Examples of non-volatile memory include read only memory (ROM), programmable ROM (PROM), erasable PROM (EPROM), electronically EPROM (EEPROM), and flash memory.

In the illustrative embodiment, the illustrative FOTA update received by the electronic device affects the software application files 210, operating system files 212, firmware 214, or combination thereof that is associated with non-volatile memory 206. The electronic device then proceeds to apply the FOTA updates using the FOTA client 216 and the back-up and restore module 218.

The FOTA client 216 and the back-up and restore module 218 affect variant non-volatile items, and do not affect the invariant volatile items. There are two kinds of non-volatile items, namely, variant and invariant. The files and offset for the invariant non-volatile items does not change between a first FOTA upgrade build and a second FOTA upgrade build. However, the files and offsets for the variant non-volatile items may potentially change. The FOTA client 216 and back-up and restore module 218 generate new offsets that are consistent with the most recent FOTA update.

The FOTA client 216 comprises a non-volatile task that reads and writes non-volatile items by using the offsets in the file, size of the item, and file name as given in the operational table. Recall, the "operational table" in the FOTA update software may be referred to as a "non volatile operation table file" that may embodied in an "nv_op_tab.c" file. This file is auto generated during the build process from an illustrative intermediate data file (idf). In the illustrative embodiment, only the non-volatile items are stored in the embedded file system (EFS) along with an active flag denoting the status of the non-volatile items, and the corresponding enumeration value of the non-volatile item is not stored.

The back-up and restore module 218 saves the offsets and then restores the offsets in the EFS after the FOTA update is complete. An offset refers to the number of address locations added to a base address in order to get a specific absolute address. Without the back-up and restore module 218, the offsets, item size and file name in the operational table can not interpret the raw data. Thus, the back-up and restore module 218 ensures that any changes in the non-volatile items like addition, deletion, change of file, change of size will make the offsets defined in the operating table consistent with the offsets of various non-volatile items previously stored in the EFS.

By way of example and not of limitation, the electronic device 204 tracks the major and minor version numbers, e.g. Version 1.0.18, and the changes among the non-volatile items. The FOTA client 216 non-volatile task performs a rebuild when the most recent version number is different from those stored in the EFS. The back-up and restore module 218 ensures that during the rebuild all the variant non-volatile items are active and usable.

Figure 4:
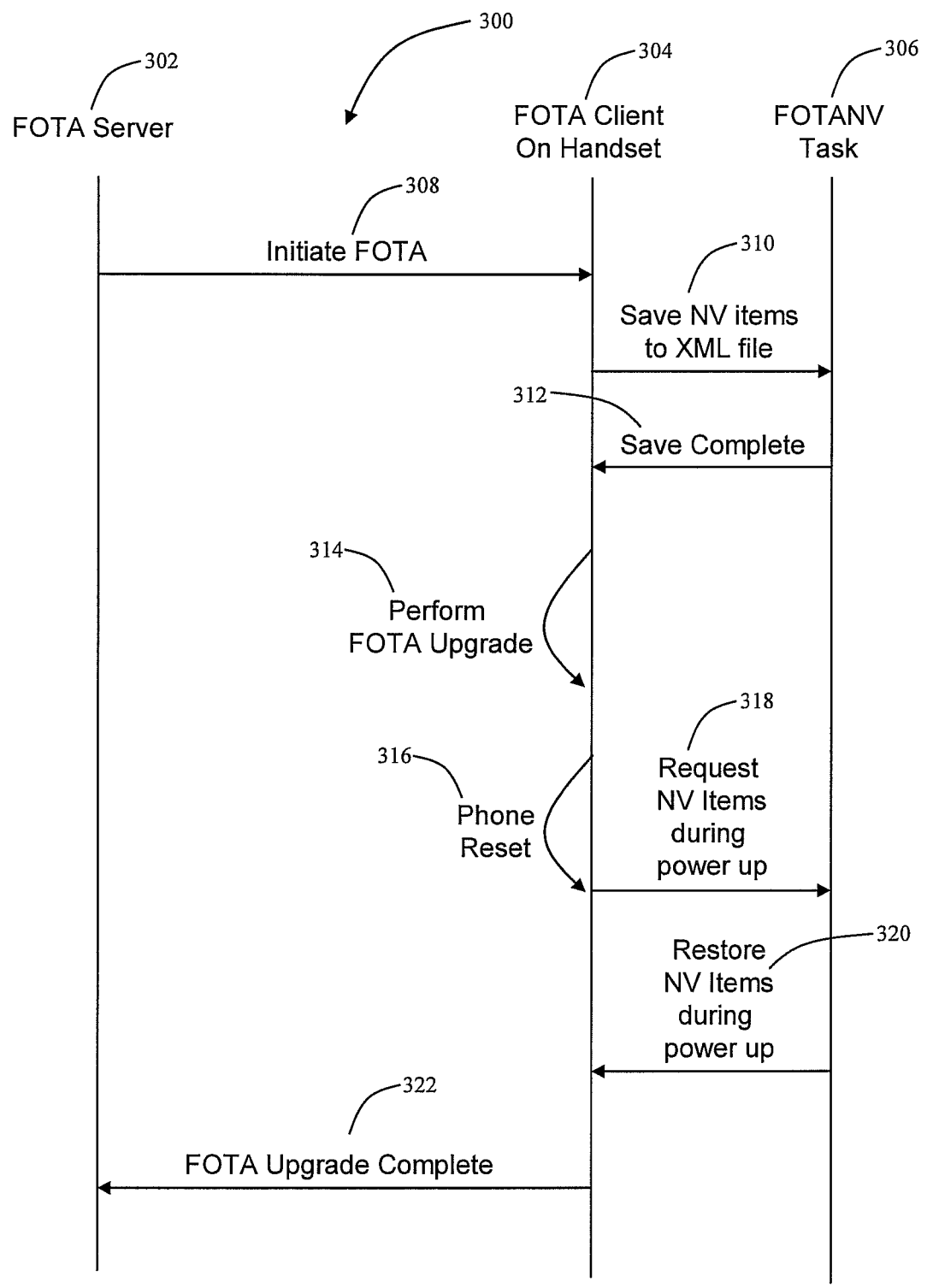
FIG. 4 shows a sequence diagram of the operations and tasks performed by a server and a client according to one embodiment.

Referring to FIG. 4 there is shown a sequence diagram of the operations and tasks performed by an illustrative server and client. The illustrative FOTA server 302 communicates a FOTA upgrade 308 to a FOTA client 304 on a wireless handset such as wireless handset 100 in FIG. 2. Prior to initiating the FOTA upgrade, all the non-volatile items will be backed up and stored in an illustrative neutral file format.

The FOTA client 304 then proceeds to initiate the process of saving the non-volatile items 310 including, but not limited to, variant non-volatile items. In one embodiment, the triggers for starting the back-up of the non-volatile items is provided by the back-up and restore module 306 or FOTANV task 306. In an alternative embodiment, the trigger for the back-up process is provided by the FOTA client 304.

By way of example and not of limitation, the FOTANV task 306 or back-up and restore module 306 stores the non-volatile items in an illustrative XML file format, and indicates that the back-up or save process is complete 312. The XML format is an international standard format and permits simple file parsing, simplified report generation, and other such tools are associated with the XML format. Alternatively, a proprietary file format may also be used.

By way of example and not of limitation, all the non volatile items in the back-up file are stored along with a checksum algorithm such as a cyclic redundancy check (CRC) to ensure that data has not been corrupted. For example, a 30-bit CRC may be generated using the polynomial $x^{30} x^{29} x^{21} x^{20} x^{15} x^{13} x^{12} x^{11} x^8 x^7 x^6 x^2 x^1$. During the restore process, if the checksum for any non-volatile item does not match the calculated checksum, then the non-volatile item will be made inactive. The checksum operation is performed to prevent rogue files from being installed.

The FOTA client on the handset 304 then proceeds to initiate the FOTA upgrade. After the files associated with the FOTA upgrade have been processed, the illustrative wireless handset begins the reset process 316. The phone reset 316 comprises powering down the handset and then powering up the illustrative wireless handset.

During the power up, the FOTA Client 304 requests the non-volatile items 318 that had been previously backed up including, but not limited to, the variant items. The back-up and restore module 306 then proceeds to restore the non-volatile items during power up 320. By way of example and not of limitation, the triggers for the restore are provided by the main controller (TMC) task, which is associated with the FOTA client. The TMC task may then proceed to initiate the FOTANV task 306, the EFS, and the non-volatile items. Subsequently, all the non-volatile items in the back-up file are rewritten using the newly updated wireless handset software. By using the updated software to write the variant non-volatile items from a backed-up file, the offsets in the EFS files associated with the non-volatile items are consistent with the operating table in the newly updated software. Those non-volatile items that are not present in the back-up file are made inactive.

After the FOTA client 304 completes the restore and prevents other tasks from reading the non-volatile items before the restore process is completed, and then the TMC initiates the other service tasks followed by the application tasks. And the FOTA client 304 then communicates that the FOTA upgrade is complete 322 to the FOTA server 302.

Figure 5:
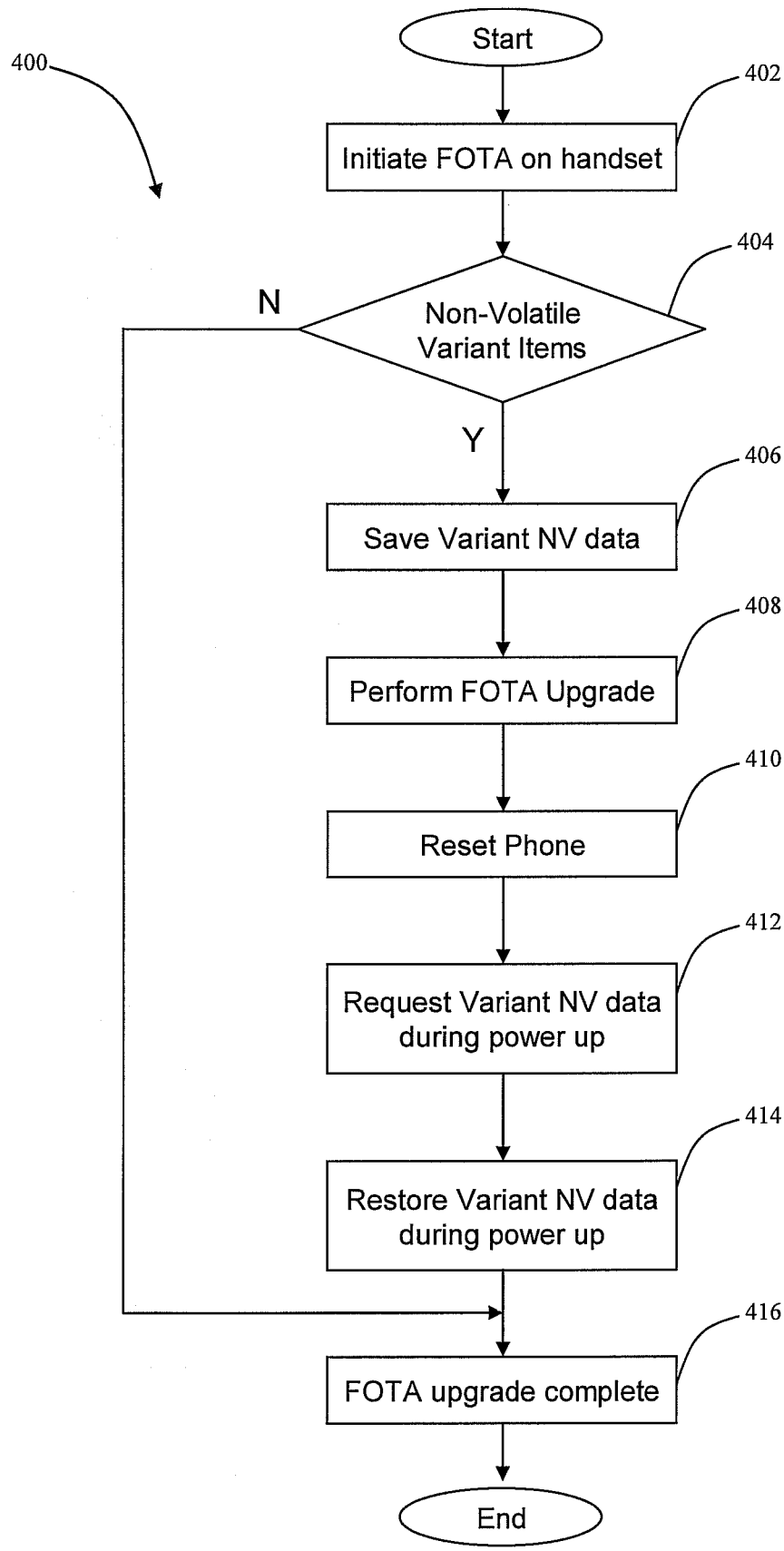
FIG. 5 shows an illustrative flowchart of a method for preserving parameters during a FOTA upgrade involving the modification of non-volatile items according to one embodiment.

Referring to FIG. 5 there is shown an illustrative flowchart of a method for preserving device parameters during a FOTA upgrade involving the modification of non-volatile items. The method is initiated at block 402 where the FOTA update is communicated from the server 24 to the illustrative wireless handset 14 shown in FIG. 1 or device 204 in FIG. 3.

After the FOTA update is received, a determination is made at decision diamond 404 whether a particular non-volatile item is either a variant non-volatile items or an invariant non-volatile item. Recall, that the offsets and files for the invariant non-volatile items don't change from build to build, however, the offsets and files associated with the variant non-volatile items can potentially change. Therefore, if one or more invariant non-volatile items are identified, there is no need to perform the back-up and restore.

The identified variant non-volatile items proceed to block 406 where the variant non-volatile data is saved or backed-up as described previously. In one embodiment, the non volatile items in the back-up file are stored along with a checksum algorithm such as a cyclic redundancy check (CRC) to ensure that data has not been corrupted. As previously noted, variant non-volatile items may be made unusable or inactivated during a FOTA upgrade because the offset values associated with the FOTA upgrade may be different from the offset values in the previously running software version.

The method then proceeds to block 408, where the FOTA upgrade is performed. At block 410, the wireless handset 100 or electronic device 204 is reset. By way of example and not of limitation, during the reset process the wireless handset 100 or electronic device 204 is turned off and on, or power down and then powered up.

During the power up at block 412, the electronic device requests the non-volatile items 318 that had been previously backed up including, but not limited to, the variant items. The method then proceeds to restore the non-volatile items during power up at block 414. By preserving, i.e. backing up, the variant non volatile items in a neutral file format, all the non volatile items in the back-up file are re-written using the new software associated with the FOTA upgrade, thereby creating new offsets that are consistent the new software upgrade.

At block 416, the FOTA upgrade is completed. A message indicating that the FOTA upgrade is complete may be sent to the management module 30 associated with the firmware device management server 28 shown in FIG. 1.

The systems, device and methods described above preserve the integrity of the variant non-volatile items that may be made unusable or inactivated during a FOTA upgrade. Additionally, the FOTA upgrade device, system and method that are presented preserves essential device parameters by storing all the non-volatile items and restoring the non-volatile items during the FOTA upgrade process. Furthermore, the solution described above preserves the non-volatile items by storing them and prevents putting the wireless handset in an unusable state by creating new offsets that are consistent with the FOTA upgrade.

It is to be understood that the detailed description of illustrative embodiments are provided for illustrative purposes. The scope of the claims is not limited to these specific embodiments or examples. For example, a wireless handset 100 is described, however this solution may be extended to any source electronic device configured to perform a FOTA upgrade. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. An electronic device comprising:
    a non-volatile memory comprising a back-up file, the back-up file comprising at least one phone parameter associated with a prior version of a firmware program utilized to establish communications between the electronic device and an access point, the at least one phone parameter comprising at least one variant non-volatile item having at least one variant offset stored within the back-up file within the non-volatile memory, the at least one variant offset associated with the prior version of the firmware program utilized by the electronic device;
    a processor communicably coupled to the non-volatile memory;
    a firmware over-the-air client module executed by the processor, the firmware over-the-air client module configured to receive a firmware over-the-air upgrade and replace the prior version of the firmware program utilized by the electronic device; and
    a back-up and restore module executed by the processor, the back-up and restore module configured to store the at least one variant non-volatile item before the firmware over-the-air client module performs the firmware over-the-air upgrade, wherein the firmware over-the-air client module is configured to reset the wireless handset after the firmware over-the-air client module performs the firmware over-the-air upgrade, wherein the reset is a power cycle of the electronic device, wherein the firmware over-the-air client requests the at least one stored variant non-volatile item during a power up of the power cycle of the electronic device;
    the back-up and restore module further configured to:
        rewrite the at least one variant non-volatile item into the firmware over-the-air upgrade after the firmware over-the-air client module resets the wireless handset, and
        generate a new offset for each restored variant non-volatile item.

2. The electronic device of claim 1 wherein the electronic device is a wireless mobile handset that receives the firmware over-the-air upgrade over a wireless communication link, and the firmware over-the-air client module is resident on the wireless handset.

3. The wireless handset of claim 2 wherein the back-up and restore module is configured to store the at least one variant non-volatile item using an Extensible Markup Language (XML).

4. The wireless handset of claim 2 wherein the back-up and restore module is configured to store the non-volatile items and a checksum generated using a checksum algorithm.

5. The wireless handset of claim 2 wherein the firmware over-the-air client module continues the firmware upgrade after the at least one variant non-volatile item have been rewritten.

6. A communication system comprising:
    a server configured to receive a firmware over-the-air upgrade and communicate the firmware over-the-air upgrade; and
    a wireless handset configured to receive the FOTA upgrade from the server via a wireless communication link, the wireless handset comprising:
        a non-volatile memory comprising a back-up file, the back-up file comprising at least one phone parameter associated with a prior version of a firmware program utilized to establish communications between the wireless handset and an access point coupled to the server, the at least one phone parameter comprising at least one variant non-volatile item having at least one variant offset stored within the back-up file within the non-volatile memory, the at least one variant offset associated with the prior version of the firmware program utilized by the wireless handset;
        a processor communicably coupled to the non-volatile memory;
        a firmware over-the-air client module executed by the processor, the firmware over-the-air client module configured to receive the firmware over-the-air upgrade and replace the prior version of the firmware program utilized by the wireless handset; and
        a back-up and restore module executed by the processor, the back-up and restore module configured to store the at least one variant non-volatile item before the firmware over-the-air client module performs the firmware over-the-air upgrade, wherein the firmware over-the-air client module is configured to reset the wireless handset after the firmware over-the-air client module performs the firmware over-the-air upgrade, wherein the reset is a power cycle of the wireless handset, wherein the firmware over-the-air client requests the at least one stored variant non-volatile item during a power up of the power cycle of the wireless handset;
        the back-up and restore module further configured to:
            rewrite the at least one variant non-volatile item into the firmware over-the-air upgrade after the firmware over-the-air client module resets the wireless handset, and
            generate a new offset for each restored variant non-volatile item.

7. The system of claim 6 wherein the back-up and restore module is configured to store the at least one variant non-volatile item using an Extensible Markup Language (XML).

8. The system of claim 6 wherein the back-up and restore module is configured to store the non-volatile items and a checksum generated using a checksum algorithm.

9. The system of claim 6 wherein the firmware over-the-air client module continues the firmware upgrade after the at least one variant non-volatile item have been rewritten.

10. The system of claim 6 wherein the firmware over-the-air client module communicates completion of the firmware upgrade to the server.

11. A method for preserving phone parameters, including non-volatile items, during a firmware over-the-air upgrade on an electronic device, the electronic device including a non-volatile memory comprising a back-up file, the back-up file comprising at least one phone parameter associated with a prior version of a firmware program utilized to establish communications between the electronic device and an access point coupled to a server, the at least one phone parameter comprising at least one variant non-volatile item having at least one variant offset stored within the back-up file within the non-volatile memory, the at least one variant offset associated with the prior version of the firmware program utilized by the electronic device, the method comprising:

receiving a firmware over-the-air upgrade from the server;

temporarily storing the at least one variant non-volatile item with a back-up and restore module;

initiating the firmware over-the-air upgrade with a firmware over-the-air client module after the storing step;

resetting the electronic device after the initiating step, wherein the resetting is a power cycle of the electronic device, wherein the at least one stored variant non-volatile item is requested during a power up of the power cycle of the electronic device;

rewriting the at least one variant non-volatile item into the over-the air upgrade after the resetting step; and generating a new offset for each restored variant non-volatile item.

12. The method of claim 11 wherein the storing of the at least one variant non-volatile item comprises using an Extensible Markup Language (XML).

13. The method of claim 11 wherein the storing of the non-volatile items comprises using a checksum algorithm to generate a checksum.

14. The method of claim 11 further comprising continuing the firmware upgrade after the rewriting step.

* * * * *